W. WEIS.
Fastenings for Egg and Fruit Box Covers.
No. 165,044. Patented June 29, 1875.
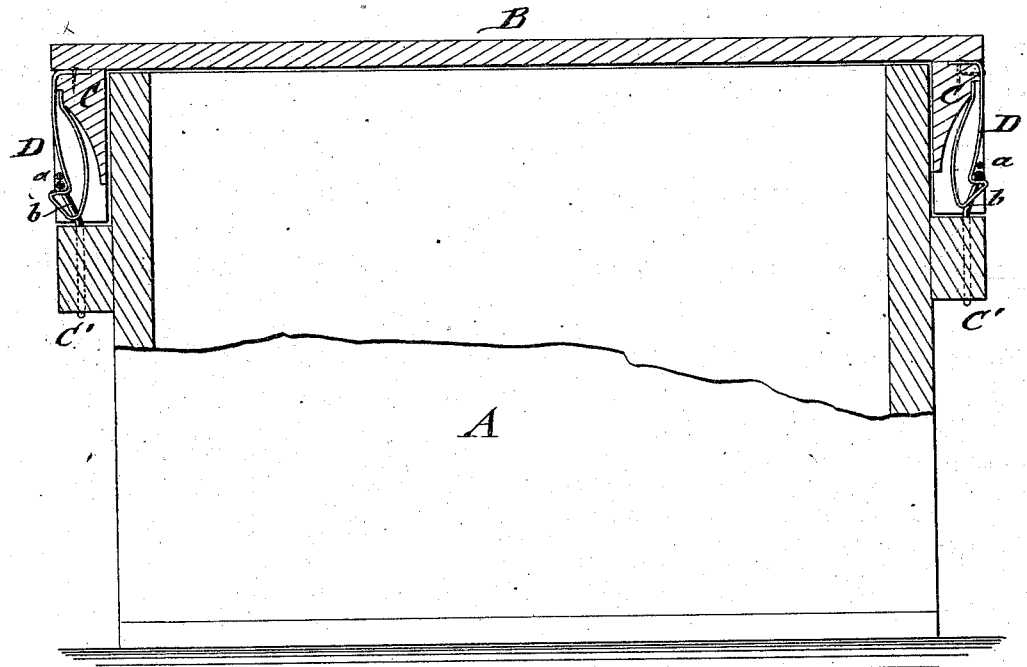
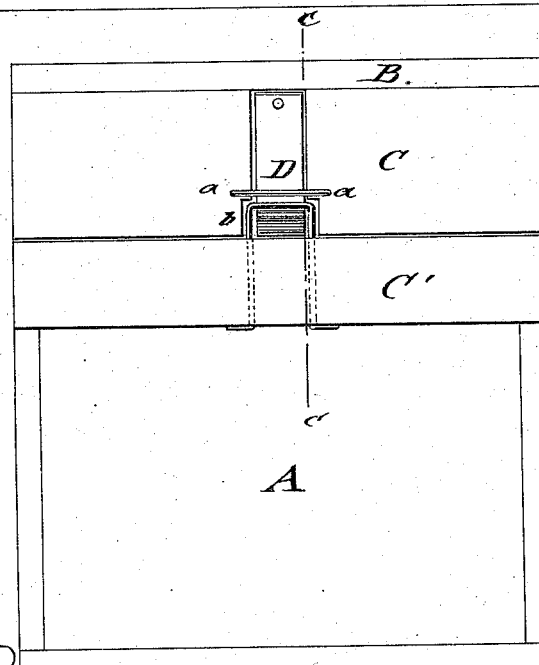
WITNESSES:
INVENTOR:
W. Weis
BY
ATTORNEYS.

UNITED STATES PATENT OFFICE.

WENDELIN WEIS, OF ST. PAUL, MINNESOTA.

IMPROVEMENT IN FASTENINGS FOR EGG AND FRUIT BOX COVERS.

Specification forming part of Letters Patent No. 165,044, dated June 29, 1875; application filed May 1, 1875.

*To all whom it may concern:*

Be it known that I, WENDELIN WEIS, of St. Paul, in the county of Ramsey and State of Minnesota, have invented a new and Improved Fastening for Egg and Fruit Box Covers, of which the following is a specification:

In the accompanying drawing, Figure 1 represents a vertical transverse section of my improved egg and fruit case or box, on the line $c$ $c$, Fig. 2, showing spring attachment of cover; and Fig. 2, a side elevation of the same.

Similar letters of reference indicate corresponding parts.

The object of my invention is to furnish for the shipping of eggs, fruit, and similar articles a case or box with improved fastening device for lid and box, which may not be injured during transportation, and readily opened or closed.

My invention consists in providing the recessed side strips of the lid with double-acting band-spring hooks, which are retained by cross-wires and locked to staples of the side strips of the box.

In the drawing, A represents the case or box for shipping eggs, fruit, &c., and B the lid of the same. The lid B has side strips C, which fit over the case, and are seated on the outer side strips C' of the box. Each side strip C is centrally recessed for applying a double-acting band-spring hook, D, which is securely fastened to the upper edge of the strip, full play for action being given in the recess, while a wire protection or staple, $a$, driven into the strip across the recessed part retains the spring when the lid is taken off, and prevents the projecting and exposing to injury of the same. The outer side strips C' of the box have wire staples or catches $b$, to which the spring-hooks lock on placing the lid on the box. The locking device is entirely within the recess, and therefore protected against damage during shipment. It has also the further advantage that the spring hooks and staples are attached to the side strips only, which allows their sale to parties who desire to make up the boxes themselves, saving freight in the sending of the same.

Having thus described my invention, I claim as new and desire to secure by Letters Patent—

As an improvement in fastenings for egg and fruit box covers, the combination of the recessed side strips of the lid, provided with double-acting band-spring hooks, with staples of the outer side strips of the box, substantially as and for the purpose set forth.

WENDELIN WEIS.

Witnesses:
CLAUDE VAN TROTHA,
H. H. TIMME.